July 23, 1935.  W. O. KENYON ET AL  2,008,984

WRAPPING MATERIAL

Filed June 15, 1932

B - Moistureproof Coating.
A - Cellulosic Base Sheet.
C - Coating Comprising a Mixed Cellulose Organic Ester, One of the Acyl Groups of Which Contains Free Carboxyl.

A - Cellulosic Base Sheet.

William O. Kenyon
& Russel H. Van Dyke;
Inventors

By Newton M. Perkins
Daniel J. Mayne
Attorneys

UNITED STATES PATENT OFFICE 2,008,984

WRAPPING MATERIAL

William O. Kenyon and Russel H. Van Dyke, Rochester, N. Y., assignors to Eastman Kodak Company, Rochester, N. Y., a corporation of New York Application June 15, 1932, Serial No. 617,342

20 Claims. (Cl. 91—68)

This invention relates to wrapping materials and has particular reference to a thin, flexible, transparent type of cellulosic sheeting one or both surfaces of which are adapted for the application of water soluble adhesives.

Several types of flexible, transparent sheeting produced from cellulosic substances have been developed in recent years and have found wide use as wrapping material and in the manufacture of many devices such as packages, cartons, envelopes and other containers. Some of these wrapping materials have been waterproofed, or moistureproofed, by the application of a water-resistant composition while others have not been so treated. The moisture-proof materials have met with some success due to their peculiar properties of water-resistance, transparency, flexibility, toughness, and general adaptability to wrapping purposes. Notwithstanding these valuable properties, they have one serious drawback, namely, the fact that the ordinary types of cellulosic surfaces, especially those produced from cellulose ester materials, are not suitable for the application of water-soluble adhesives. It is a matter of common knowledge that when a tax stamp, label, gummed strip, or the like, having an adhesive surface of glue, gum arabic, or other adhesive materials, is moistened and applied to the above-mentioned types of cellulosic sheeting, it almost immediately curls up and drops off because of the incompatibility of the adhesive substances and the cellulosic material. This is especially true when the adhesive-coated stamp or label is applied to cellulose ester sheeting. In order to overcome this difficulty, a number of remedies have been suggested, including the proposal to use a special type of adhesives on the stamps or labels themselves, or to apply a special adhesive cement when affixing them, which cement would be compatible with the cellulosic surface, but none of these remedies have thus far proved convenient or commercially practicable.

It is the primary object of our invention to overcome the difficulties just referred to, and to provide a means whereby the ordinary types of water-soluble adhesives may be successfully employed with cellulose ester sheeting. Another and specific object is to provide a means for applying the conventional types of gummed labels, tax stamps, and other matter having a surface coated with a water-soluble adhesive to such sheeting by merely moistening the adhesive surface and affixing the stamp or label in the customary manner. A further object is to provide a new type of moisture-resistant cellulosic sheeting at least one of the surfaces of which is adapted to the application of water-soluble adhesives such as glue and gum arabic. A still further object is to provide a type of moistureproof sheeting having one surface moistureproofed and the other surface comprising an extremely thin layer of mixed cellulose organic ester material to which water-soluble adhesives will permanently adhere. Another object is to provide a type of sheeting having a moistureproofed surface and a stamp-adhering surface both of which surfaces are susceptible of fluxing or sealing by means of a common solvent. Other objects will hereinafter appear.

Our invention is based upon the discovery that if a thin coating (even an extremely thin coating) comprising a mixed cellulose organic ester containing a free carboxyl group in the cellulosic molecule is applied to the surface of a cellulose ester sheet, such as cellulose acetate or other organic ester, the surface so treated is thereby rendered susceptible of permanently receiving a tax stamp, gummed label, or other matter having an adhesive surface containing a water-soluble adhesive. Although the ordinary adhesives cannot be made to permanently adhere to a cellulosic surface, such as that of a sheet of cellulose acetate, a surface comprising one of the mixed cellulose organic esters such as cellulose acetate phthalate, cellulose acetate succinate, cellulose acetate diglycollate, cellulose acetate tartrate and the like possesses the remarkable and unexpected property of permitting the permanent adhesion of materials coated with water-soluble adhesives. The mixed esters which we have found suitable for effecting this permanent adhesion appear to be characterized by the fact that they contain in the cellulose molecule a free carboxyl group and represent the esterification of cellulose acetate with a dicarboxylic acid, as in the case of cellulose acetate phthalate. They may also contain a free hydroxyl group as in the case of cellulose acetate tartrate but their utility in our invention is not dependent upon this latter characteristic.

These mixed esters which we utilize in our invention may be prepared in accordance with the Malm and Waring application Ser. No. 380,252 filed July 22, 1929 in which hydrolyzed cellulose acetate is treated in the presence of pyridine with the anhydride of the dicarboxylic acid which it is desired to introduce into the cellulose acetate molecule to give a mixed ester in which one carboxyl is joined to the cellulose acetate molecule and the other carboxyl is united with pyridine. The pyridine is then removed by acidifying the mixed ester giving a free carboxyl radicle. The cellulose acetate succinates are further described in the application Ser. No. 627,150 filed July 30, 1932 of Malm and Waring—a division of the above application and the cellulose acetate diglycollates are fully described in the copending application of Malm and Fordyce, Ser. No. 627,147 filed July 30, 1932. The cellulose acetate tartrates and the like, utilized in our invention, may be prepared by reacting upon hydrolized cellulose acetate with tartaric (or other suitable) acid as set forth in the copending application of Staud and Webber, Ser. No. 383,147, filed August 2, 1929.

Our invention is equally applicable to the treatment of moistureproofed or unmoistureproofed cellulosic sheeting produced from such materials as cellulose acetate, cellulose acetate propionate, cellulose acetate butyrate, cellulose propionate and cellulose butyrate. It is especially valuable when applied to a moistureproofed type of material such as cellulose acetate thin sheeting at least one surface of which has a thin overcoating comprising gum and wax. This moistureproof sheeting may be produced in accordance with the disclosure of the copending application of Norman F. Beach and Bruce E. Gramkee, Ser. No. 551,491, filed July 17, 1931, and involving the application of a solution of gum and wax in a common solvent to one side of a base sheet of cellulose acetate or other cellulose organic derivative. In some cases the sheet may be produced according to the process disclosed in the application of Norman F. Beach and James G. McNally, Serial No. 551,490, filed July 17, 1931, in which the cellulosic base sheet is first coated with a gum or resin solution followed by the application of a wax solution. In any case, when dealing with a moistureproof material, it should have the moistureproof coating on one side only, leaving the other surface free for the application of the special stamp-adhering composition hereinafter described.

The special compositions of our invention are made up by dissolving a mixed cellulose organic ester of the type indicated in an appropriate solvent and applying the composition to the sheeting under such conditions as to produce an extremely thin tightly-adhering layer of the mixed cellulose ester upon one surface of the sheeting after evaporation of the solvents. In the following examples of compositions adapted for the production of such a thin surface layer, we have set forth several of the preferred embodiments of our invention, but it is to be understood that they are included merely for purposes of illustration and not as a limitation thereof. The solutions given below preferably contain 2–5% by weight of the dissolved component.

*Compositions for coating thin cellulose acetate sheeting (.001″ thickness)*

| Mixed ester | | Solvent (parts by volume) |
|---|---|---|
| Cellulose acetate phthalate. | 18% phthalyl<br>22% phthalyl | 60% cellosolve—40% toluene.<br>50% cellosolve—50% toluene. |
| Cellulose acetate phthalate. | 28% phthalyl | 85% cellosolve—15% xylene. |
| Cellulose acetate phthalate. | 34% phthalyl | 40% cellosolve—60% toluene. |
| Cellulose acetate phthalate. | 40% phthalyl | 40% cellosolve—60% toluene. |

*Compositions for coating thick cellulose acetate sheeting (.005″ thickness)*

| Mixed ester | | Solvent (parts by volume) |
|---|---|---|
| Cellulose acetate phthalate. | 18% phthalyl<br>28% phthalyl | 80% ethylene chloride—20% isopropyl alcohol.<br>80% ethylene chloride—20% isopropyl alcohol. |
| Cellulose acetate phthalate. | 34% phthalyl | 40% methyl cellosolve—60% toluene. |
| Cellulose acetate phthalate. | 40% phthalyl | 45% methyl cellosolve—55% toluene. |
| Cellulose acetate succinate. | 20% succinyl<br>33.6% succinyl | 100% methyl cellosolve 1-4 dioxan. |

*Compositions for coating cellulose acetate-propionate sheeting*

| Mixed ester | | Solvent (parts by volume) |
|---|---|---|
| Cellulose acetate phthalate. | 18% phthalyl | 65% cellosolve—35% toluene |
| Cellulose acetate phthalate. | 28% phthalyl | 65% cellosolve—35% toluene |
| Cellulose acetate phthalate. | 40% phthalyl | 65% cellosolve—35% toluene. |

*Compositions for coating cellulose-stearate sheeting*

| Mixed ester | | Solvent (parts by volume) |
|---|---|---|
| Cellulose acetate phthalate. | 18% phthalyl | 65% cellosolve—35% toluene. |
| Cellulose acetate phthalate. | 28% phthalyl | 65% cellosolve—35% toluene. |
| Cellulose acetate phthalate. | 40% phthalyl | 65% cellosolve—35% toluene. |

In addition to the above formulæ it has been found that a highly satisfactory stamp-adhering surface may be produced if thin sheeting of the general character described above is treated by the application of a solution containing a mixed cellulose organic ester to which a glycol has been added. A typical formula has the following composition:

*Nonvolatile materials*

60% cellulose acetate phthalate (containing approximately 18 to 40%)
40% diethylene glycol Made up to 2% solution in a solvent comprising:
65% toluene
35% cellosolve The concentration of glycol in solutions of the above character may vary considerably. Good results are obtained with as low as 20% or even lower percentages of glycol, based on the total weight of non-volatile materials, and as high as 50% or more of this ingredient.

It will be seen from the above tabulation that our invention is founded on the peculiar and unexpected property of the mixed cellulose organic esters to render cellulose ester sheeting capable of permanently receiving a water-soluble adhesive. Mixed cellulose esters satisfactory for this purpose include cellulose acetate phthalate of varying phthalyl content, (about 18% or less to 40% or more phthalyl) cellulose acetate succinate of varying succinyl content (approximately 20% or less to 35% or more succinyl) and similarly cellulose acetate tartrate, cellulose acetate diglycollate, cellulose acetate oxalate, cellulose acetate malate and many others, all of these esters being distinguished by the fact that they contain a free carboxyl group.

Assuming that the invention is applied to the manufacture of a moistureproof type of cellulosic material, such as cellulose acetate thin sheeting, one side of which has an overcoating of gum and wax or other moisture-resistant materials, a thin coating of the composition typified by one of the above formulæ is applied to the unmoistureproofed side of the sheet, the solvents are removed by evaporation and an extremely thin, tightly-adhering layer of mixed cellulose organic ester is deposited on the surface of the sheeting. This surface is susceptible of tightly and permanently holding a stamp or gummed label having a coating of water-soluble adhesive thereon. Although water-soluble adhesives cannot be made permanently to adhere to ordinary cellulose ester surfaces, such as those composed of cellulose nitrate, cellulose acetate, and the like, such adhesives will readily stick to surfaces comprising the mixed cellulose organic ester materials herein disclosed. The manufacture of our improved type of sheeting will be made clear by reference to the accompanying drawing in which:

Figure 1:
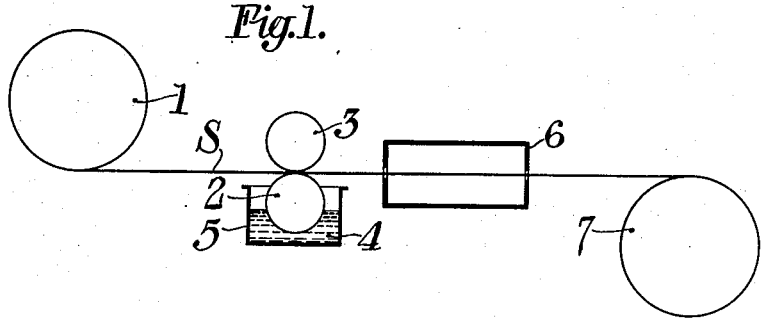
Fig. 1 is a diagrammatic representation of one form of apparatus suitable for the manufacture of a sheet moistureproofed on one side and specially treated according to the present invention on the other.

A suitable method of applying the special composition described above is illustrated in Fig. 1. A thin, flexible, transparent sheet of cellulosic material, cellulose acetate, for example, moistureproofed on one side by the application of gum-wax composition passes from supply roll 1, between subbing roll 2 and squeeze roll 3, the moistureproofed side being uppermost. Roll 2 dips in a bath of liquid 4 contained in vat 5. This bath may comprise any one of the formulæ indicated above as suitable for application to a sheet of cellulose acetate. Roll 2 applies the composition to the under surface of the sheet S, while squeeze roll 3, which is mounted so as to give the desired pressure to the sheet, serves to control the thickness of the coating applied to the under side thereof as it passes between the rolls. The sheet S then passes through the drying chamber 6 at a speed of about 10–30 ft. per minute where it is subjected to a temperature of about 100–120° C. Upon emerging from the drying chamber it is passed to wind-up roll 7.

If it is desired to apply the special treating liquid to both sides of an unmoistureproofed material, the sheet may be immersed in, or drawn through a bath of the treating liquid according to the well-known principle of immersion application of coating fluids to sheets or webs. It will, of course, be understood that many modifications may be made in the method and means of application of these coating compositions within the scope of our invention. It may be said that the coating operation forms no part of the present invention.

Although we have described the application of our special composition to a previously formed sheet of material, the coating operation may be carried out in connection with the manufacture of the sheeting itself. In such a process the sheet is coated onto an appropriate surface from a suitable dope or solution, the solvents are evaporated therefrom, the sheet stripped from the coating surface and thereafter passed directly to the operation in which the special treating liquid of the present invention is applied. If desired, a stamp-adhering layer may be applied to one side of the unmoistureproofed material, followed by application of a moisture-resistant coating to the other side much in the same manner as disclosed in Beach and Babcock application Serial No. 617,349 filed of even date herewith.

It will be apparent that many modifications may be made within the scope of our invention. For example, instead of using a base sheet of cellulose acetate, we may apply the above described special compositions equally well to a base sheet of cellulose propionate, cellulose butyrate, cellulose acetate propionate, cellulose acetate stearate and other cellulose organic ester material.

While we have described the treatment of a thin, flexible, cellulosic sheeting, our invention is not limited thereto. It is equally applicable to the treatment of thin cellulosic sheeting of the order of .001″ or less and to the treatment of thick sheets or even slabs or blocks of cellulose ester materials or molded objects made therefrom. It should be noted, however, that the thickness of the object treated governs to a large extent the particular solvent or solvent combination employed in the coating formula. With the thinner types of material such as those commonly used for wrapping purposes it is necessary to select a solvent which will have no undesirable solvent effect upon the base sheet itself, although we have found that good adhesion is obtained if the solvent very slightly attacks the base sheet and softens it sufficiently to form a better anchorage for the thin superposed coating of mixed cellulose organic ester. With thicker materials the solvent may also have a slight softening action sufficient to cause penetration of the composition into the material, the degree of penetration being of less moment than with the thinner materials. In any case, however, the action of the solvent should not go to the point of actual solution of any considerable portion of the base material but should be controlled so as to avoid an undesirable softening or weakening thereof.

Figure 2:
Fig. 2 is a cross section through a portion of a sheeting having a moistureproof layer on one side and a special stamp adhering layer on the other, the thickness of the base sheet and the surface layers being greatly exaggerated for the sake of clearness of illustration.
Figure 3:
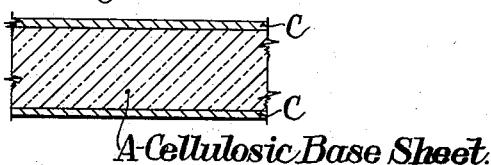
Fig. 3 is a cross section through a portion of a sheet having a stamp-adhering layer on both sides, the thickness of the respective layers as in Fig. 2 being greatly exaggerated in the interest of clearness of illustration.

Reference to Figs. 2 and 3 discloses the general nature of the sheeting produced according to the present invention. The base sheet A is a relatively thin cellulosic sheet of approximately .001″ in thickness, having a coating B comprising a moisture-resistant material containing preferably gum and wax. Upon the opposite side of the sheet is the layer C which consists of an extremely thin coating comprising a mixed cellulose organic ester. The material illustrated in Fig. 3 differs from that of Fig. 2 only in that the moisture-resistant coating is omitted from one side of the sheet and the special stamp-adhering coating is applied to both sides thereof.

We have found that those mixed cellulose organic esters having a free carboxyl group present in one of the acyl groups possess the unexpected property of rendering cellulosic sheeting capable of permanently receiving a water-soluble adhesive. While we offer no theory or explanation of this phenomenon, we believe that this peculiar property depends upon the solubility characteristics of the mixed ester. Cellulose acetate phthalate, for example, is a material which tends to be water-soluble. This same property is present in the mixed cellulose organic esters produced from such acids as succinic, diglycollic, malic and oxalic and from the hydroxyaliphatic acids such as tartaric acid. The presence of the carboxyl, or even of the free acid in some cases, apparently increases the solubility of the mixed ester in water and thereby makes possible the permanent application of water-soluble adhesives to the sheeting to which they are applied.

In view of the facts presented in the foregoing paragraph, we are enabled to produce an entirely new type of sheeting by forming it from the mixed cellulose organic ester itself. Such operation may be carried out by coating a sheet onto an appropriate surface from a suitable solvent as in the case of producing sheets from other cellulose esters. A tin sheet of cellulose acetate phthalate, for example, is found to receive a water-soluble adhesive with great tenacity. It may be said at this point that the degree of adhesion obtained with different adhesives and with different types of surfaces varies with the materials involved and no definite standard of comparison can be set up. In general, however, in the case of stamps, gummed labels, and the like, good adhesion is said to be obtained when it is necessary to completely destroy the body of the stamp before it may be removed.

It will be apparent that the product of the present invention has many features which distinguish it from known products of a similar nature. It is particularly distinguished by the fact that one or both surfaces of the material comprise a mixed cellulose organic ester to which a water-soluble gum or similar adhesive will permanently adhere. An important although less obvious feature of the invention resides in the fact that in the case of moistureproof materials, both the moistureproof surface and the stamp-adhering surface are susceptible of being united by the fluxing or dissolving of their respective coatings with a common solvent. This is especially important in connection with the manufacture of cartons, food containers, cigarette packages and the like, since it eliminates the necessity for applying a cement in order to join the two different types of surfaces. All that is necessary is to apply a proper solvent or solvent combination to one or both surfaces, bring them into contact and apply pressure. An immediate fusing of the respective coatings results in a strong, transparent seal or bond.

We have found that the common solvent used for fluxing the coatings of our product for the purpose of sealing or forming joints should be selected with reference to the ingredients used in the respective coatings. For example, with moistureproof sheeting the moistureproof surface of which contains ester gum and paraffin wax and the stamp-adhering surface of which comprises cellulose acetate phthalate having a phthalyl content of about 40%, the solvent may consist of any one of the following: diacetone alcohol, a mixture containing diacetone alcohol and up to about 70% toluene, cellosolve, mixtures of cellosolve and toluene, ethyl lactate, mixtures of ethyl lactate and toluene. Many other solvents or solvent combinations may be employed, those just mentioned being merely typical examples. The particular solvent or solvent combination is determined, not only by the materials present on the surfaces which it is desired to join, but also the material of the base sheet itself. If a drastic softening action on a base sheet of cellulose acetate is desired, the solvent may comprise diacetone alcohol alone. As a general rule, however, it will be desired to apply a sealing solvent which does not materially dissolve the surface of the base sheet itself, but does have a substantial dissolving action on the respective coatings of the coated sheet. When dealing with a sheet having an overcoating containing gum and wax on one side, it will be desirable to use a solvent containing a relatively high proportion of a solvent for wax which is also a solvent for the gum component of the moistureproof side and at the same time a solvent for the materials of the stamp-adhering surfaces. The wax solvent is generally a hydrocarbon, such as toluene which controls or lessens the dissolving power of the other component of the solvent combination with respect to the material of the base sheet. In most cases, a quick-drying solvent is preferred, but in some cases a slow-drying solvent is required. In the latter case, volatility of the solvent combination may be reduced by the addition of a high-boiling solvent or plasticizer such as triacetin, the amount of triacetin being determined according to the speed of drying desired.

It will be seen from the above discussion of solvent sealing that the product of the present invention is a particularly valuable contribution to the packaging art in that it is a type of wrapping material, both surfaces of which are susceptible of being joined by means of a common fluxing solvent. It will be apparent that a sheet having a moistureproof composition on one side and a stamp-adhering composition on the other side may be joined by an ordinary lap joint in which a moistureproof surface will be applied to a stamp-adhering surface, two moistureproof surfaces may be joined one to another, and, in like manner, two stamp-adhering surfaces may be so joined, all by means of a common solvent.

As is well known, a considerable amount of waste occurs in the ordinary operations of manufacturing coated sheeting and in its use as wrapping and packaging material. This would represent a serious economic loss were it not for recovery processes in which the various ingredients of the sheeting can be reclaimed. The material of the present invention is characterized by the fact that it lends itself particularly well to such processes. A simple and convenient method of reclaiming scrap derived from a moistureproof sheeting of the type herein described comprises leaching the scrap with an organic solvent, which may consist, for example, of a mixture of about equal parts of ethylene chloride and Stoddard solvent (a mixture of low boiling aliphatic hydrocarbons having a boiling range of approximately 141–210° C.) the leaching being carried out at a temperature of about 80° F. This removes the moistureproof coating, leaving the stamp-adhering surface unaffected. After draining off the organic solvent, the scrap is then subjected to a leaching treatment with hot soft water at a temperature of about 120° F. This removes the water-soluble mixed cellulose organic ester material, leaving the sheeting in a condition in which it may be re-used in the manufacture of sheeting, film and the like. These leaching steps may, of course, be reversed in order, if desired.

What we claim and desire to secure by Letters Patent of the United States is:

1. An article of manufacture comprising a wrapping sheet of cellulose ester material, a surface of which comprises a separate coating of mixed cellulose organic ester differing from the said cellulose ester material one of the acyl groups of which mixed cellulose organic ester contains a free carboxyl group.

2. An article of manufacture comprising a wrapping sheet of cellulose ester material other than cellulose acetate phthalate, a surface of which comprises a thin layer of cellulose acetate phthalate.

3. An article of manufacture comprising a wrapping sheet of cellulose ester material other than cellulose acetate phthalate, the surface of which comprises a thin layer of cellulose acetate phthalate containing approximately 18 to 40% phthalyl.

4. An article of manufacture comprising a wrapping sheet of cellulose acetate, the surface of which is coated with a thin layer of cellulose acetate phthalate.

5. An article of manufacture comprising a wrapping sheet of cellulose acetate, the surface of which is coated with a thin layer of cellulose acetate phthalate containing approximately 18 to 40% phthalyl.

6. An article of manufacture comprising a thin, flexible, transparent wrapping sheet of cellulose ester material having one surface coated with a moistureproofing composition and the other surface coated with a thin layer comprising a mixed cellulose organic ester, one of the acyl groups of which contains a free carboxyl group.

7. An article of manufacture comprising a thin, flexible, transparent wrapping sheet of cellulose ester material having one surface coated with a moistureproofing composition and the other surface coated with a thin layer comprising cellulose acetate phthalate.

8. An article of manufacture comprising a thin, flexible, transparent wrapping sheet of cellulose ester material having one surface coated with a moistureproofing composition and the other surface coated with a thin layer of cellulose acetate phthalate containing about 18 to 40% phthalyl.

9. An article of manufacture comprising a thin, flexible, transparent wrapping sheet of cellulose acetate having one surface coated with a moistureproofing composition and the other surface coated with a thin layer of cellulose acetate phthalate containing approximately 18 to 40% phthalyl.

10. An article of manufacture comprising a thin, flexible, transparent wrapping sheet of cellulose acetate having one surface coated with a gum-wax moistureproofing composition and the other surface coated with a thin stamp-adhering layer of cellulose acetate phthalate containing approximately 18 to 40% phthalyl, both of said surfaces being capable of permanent joining by fluxing with a common solvent.

11. An article of manufacture comprising a wrapping sheet of cellulose ester material, a surface of which is coated with a thin layer of cellulose acetate succinate.

12. An article of manufacture comprising a wrapping sheet of cellulose ester material, the surface of which is coated with a thin layer of cellulose acetate succinate containing about 20 to 34% succinyl.

13. An article of manufacture comprising a wrapping sheet of cellulose acetate, the surface of which is coated with a thin layer of cellulose acetate succinate.

14. An article of manufacture comprising a thin, flexible, transparent wrapping sheet of cellulose acetate having one surface coated with a moistureproofing composition and the other surface coated with a thin layer of cellulose acetate succinate containing approximately 20 to 34% succinyl.

15. An article of manufacture comprising a thin, flexible, transparent wrapping sheet of cellulose acetate having one surface coated with a gum-wax moistureproofing composition and the other surface coated with a thin stamp-adhering layer of cellulose acetate succinate containing approximately 20 to 34% succinyl, both of said surfaces being capable of permanent joining by fluxing with a common solvent.

16. An article of manufacture comprising a thin, flexible, transparent wrapping sheet of cellulose acetate, a surface of which comprises a thin layer of cellulose acetate diglycollate.

17. The process of rendering a cellulose ester surface capable of permanently receiving a water-soluble adhesive which comprises coating the surface with a thin layer of cellulose mixed organic ester one of the acyl groups of which contains a free carboxyl group.

18. The process of rendering a cellulose acetate surface capable of permanently receiving a water-soluble adhesive which comprises coating the surface with a thin layer of cellulose acetate phthalate.

19. The process of rendering a cellulose acetate surface capable of permanently receiving a water-soluble adhesive which comprises coating the surface with a thin layer of cellulose acetate phthalate containing approximately 18 to 40% phthalyl.

20. The process of rendering a cellulose acetate surface capable of permanently receiving a water-soluble adhesive which comprises coating the surface with a thin layer of cellulose acetate succinate.

WILLIAM O. KENYON.
RUSSEL H. VAN DYKE.